United States Patent
Osawa

(10) Patent No.: US 10,703,111 B2
(45) Date of Patent: Jul. 7, 2020

(54) DEGASSING APPARATUS AND INKJET RECORDING APPARATUS

(71) Applicant: Konica Minolta, Inc., Tokyo (JP)

(72) Inventor: Satoru Osawa, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/248,155

(22) Filed: Jan. 15, 2019

(65) Prior Publication Data

US 2019/0240987 A1 Aug. 8, 2019

(30) Foreign Application Priority Data

Feb. 2, 2018 (JP) .................................. 2018-017181

(51) Int. Cl.

| B41J 2/045 | (2006.01) |
|---|---|
| B41J 2/19 | (2006.01) |
| B41J 2/175 | (2006.01) |
| B01D 63/02 | (2006.01) |
| B41J 2/18 | (2006.01) |
| B01D 19/00 | (2006.01) |

(52) U.S. Cl.
CPC ............ *B41J 2/19* (2013.01); *B01D 19/0031* (2013.01); *B01D 63/02* (2013.01); *B41J 2/0451* (2013.01); *B41J 2/175* (2013.01); *B41J 2/17596* (2013.01); *B41J 2/18* (2013.01)

(58) Field of Classification Search
CPC ....... B41J 2/19; B41J 2/18; B41J 2/175; B41J 2/0451; B41J 2/17596; B01D 63/02; B01D 19/0031
See application file for complete search history.

(56) References Cited

U.S. PATENT DOCUMENTS

| 2013/0242006 A1* | 9/2013 | Anno ................. B01D 19/0031 347/85 |
|---|---|---|
| 2014/0285596 A1* | 9/2014 | Ando ......................... B41J 2/19 347/92 |
| 2017/0066250 A1* | 3/2017 | Ikeda ....................... B41J 2/175 |

(Continued)

FOREIGN PATENT DOCUMENTS

| CN | 103068580 A | 4/2013 |
|---|---|---|
| CN | 103347702 A | 10/2013 |
| EP | 2612759 A1 | 7/2013 |

(Continued)

OTHER PUBLICATIONS

Extended European Search Report issued in corresponding European Application No. EP19150896.9 dated Jul. 18, 2019 (26 pages).

(Continued)

*Primary Examiner* — Sharon A. Polk
(74) *Attorney, Agent, or Firm* — Osha Liang LLP

(57) ABSTRACT

A degassing apparatus includes a hollow fiber disposed on a supply path for a liquid, the hollow fiber including a gas permeable film permeable to dissolved gas in the liquid. The liquid is refluxed and brought into contact with a hollow interior or exterior of the hollow fiber, and a side of the hollow fiber not in contact with the liquid is depressurized to allow the dissolved gas in the liquid to permeate the depressurized side. The degassing apparatus further includes a clogging detector that detects clogging of the hollow interior of the hollow fiber caused by a component in the liquid.

11 Claims, 11 Drawing Sheets

(56) References Cited

U.S. PATENT DOCUMENTS

2018/0056665 A1* 3/2018 Suganuma ............ B01D 19/00

FOREIGN PATENT DOCUMENTS

| | | |
|---|---|---|
| JP | 2000062210 A | 2/2000 |
| WO | 2015-125521 A1 | 8/2015 |

OTHER PUBLICATIONS

Extended European Search Report issued in corresponding European Application No. EP19150896.9 dated Oct. 21, 2019 (21 pages).
First Office Action issued in corresponding Chinese Application No. 201910078808.4 dated Mar. 25, 2020 (19 pages).

* cited by examiner

DEGASSING APPARATUS AND INKJET RECORDING APPARATUS

The entire disclosure of Japanese patent Application No. 2018-017181, filed on Feb. 2, 2018, is incorporated herein by reference in its entirety.

TECHNOLOGICAL FIELD

The present invention relates to a degassing apparatus and an inkjet recording apparatus, and more particularly to a degassing apparatus capable of specifying that the cause of a failure is clogging of the hollow interior of hollow fibers when the failure occurs, eliminating the need to find another cause of the failure, and preventing an unnecessary, wasteful replacement of hollow fibers, and to an inkjet recording apparatus including the degassing apparatus.

BACKGROUND

An inkjet recording apparatus that forms an image on a recording medium by ejecting ink from the nozzles of inkjet heads by utilizing the electromechanical conversion action of a piezoelectric element has been proposed. In an inkjet recording apparatus, if gas dissolved in ink becomes bubbles and remains in the ink, it causes a failure such as non-ejection of ink from the nozzles.

For this reason, one of the conventional inkjet recording apparatuses is known to include a degassing apparatus on an ink supply path for supplying ink from the ink tank to inkjet heads (International Publication WO2015/125521). This degassing apparatus has internal hollow fibers including gas permeable films.

The degassing apparatus is configured as an internal perfusion type in which ink is perfused through the hollow portion in the hollow fibers or an external perfusion type in which ink is perfused over the outer periphery of the hollow fibers. In the internal perfusion type degassing apparatus, the outer periphery of the hollow fibers is depressurized by a vacuum pump, whereas in the external perfusion type degassing apparatus, the air pressure in the hollow portion in the hollow fibers is reduced by a vacuum pump. Then, the dissolved gas in the ink permeates the hollow fibers and is removed from the ink.

In the degassing apparatus as described above, components in the ink may precipitate in the hollow interior of the hollow fibers, and the hollow interior may become clogged. Such clogging occurs, whether the degassing apparatus is an internal perfusion type or an external pefusion type. When the hollow interior of the hollow fibers is clogged, the flow of the liquid perfusing through the hollow interior is inhibited, or the flow of the dissolved gas that has permeated the hollow interior is inhibited, and the dissolved gas in the ink cannot be sufficiently removed. As a result, a failure such as non-ejection of ink occurs.

When a failure such as non-ejection of ink occurs, clogging of the hollow interior of the hollow fibers is suspected as the cause thereof. Therefore, the hollow fibers are replaced with new fibers. However, the cause of a failure such as non-ejection is not limited to clogging in hollow fibers. If the cause of a failure is not clogging in hollow fibers or if there is another cause of clogging in hollow fibers, the failure is not resolved just by the replacement of the hollow fibers. Therefore, the real cause of the failure needs to be found, which is cumbersome. In addition, the replacement of the hollow fibers conducted in this case might even be unnecessary, which could waste the material.

SUMMARY

Therefore, embodiments of the present invention provide a degassing apparatus capable of specifying that the cause of a failure is clogging of the hollow interior of hollow fibers when the failure occurs, eliminating the need to find another cause of the failure, and preventing an unnecessary, wasteful replacement of hollow fibers, and an inkjet recording apparatus including the degassing apparatus.

Additional features of the present invention will become apparent from the following description.

According to one or more embodiments of the present invention, a degassing apparatus has a hollow fiber provided on a supply path for a liquid, the hollow fiber including a gas permeable film permeable to dissolved gas in the liquid, wherein the liquid is perfused and brought into contact with a hollow interior or exterior of the hollow fiber, and a side of the hollow fiber not in contact with the liquid is depressurized to allow the dissolved gas in the liquid to permeate the depressurized side, and the degassing apparatus includes a clogging detector that detects clogging of the hollow interior of the hollow fiber caused by a component in the liquid.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Hereinafter, a degassing apparatus and an inkjet recording apparatus according to one or more embodiments of the present invention will be described with reference to the drawings. However, the scope of the invention is not limited to the illustrated examples. In the following description, components having the same functions and configurations are denoted by the same reference signs, and descriptions thereof may be omitted.

[Configuration of Inkjet Recording Apparatus]

Figure 1:
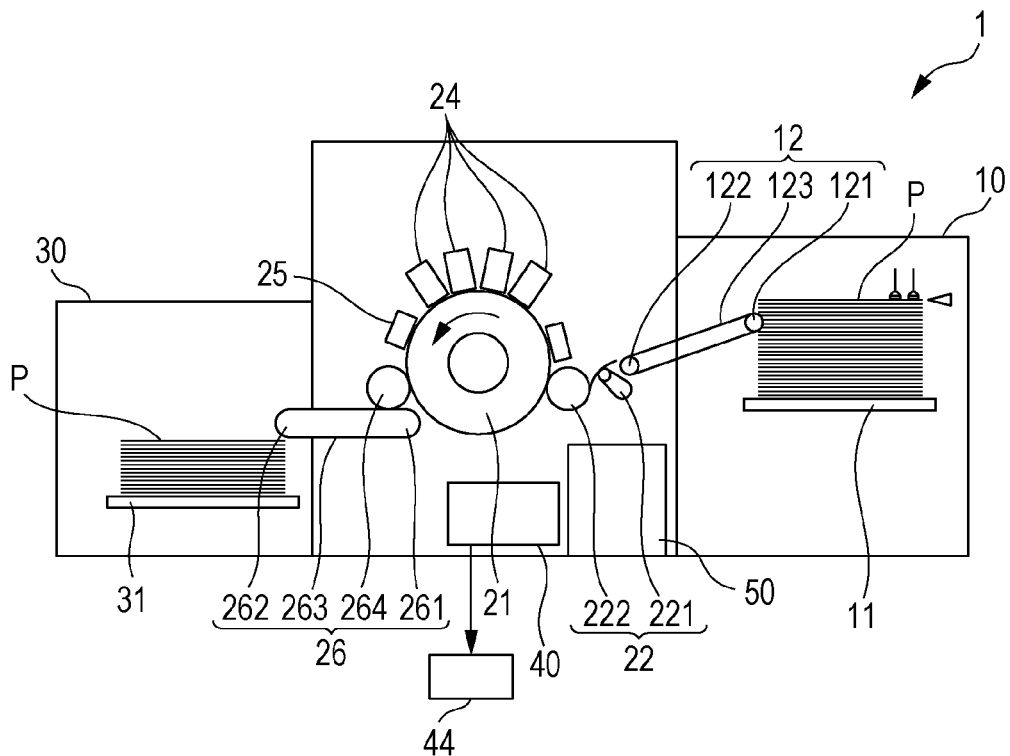
FIG. 1 is a schematic diagram illustrating the overall configuration of an inkjet recording apparatus according to one or more embodiments.

FIG. 1 is a schematic diagram illustrating the overall configuration of an inkjet recording apparatus according to one or more embodiments.

As illustrated in FIG. 1, the inkjet recording apparatus 1 includes a paper feeder 10, an image former 20, a paper discharger 30, a controller 40, and an ink supplier 50. In the inkjet recording apparatus 1, under the control of the controller 40, an image is formed by the image former 20 on a recording medium P conveyed from the paper feeder 10 to the image former 20 with the ink supplied from the ink supplier 50, and the recording medium P is then discharged to the paper discharger 30.

The paper feeder 10 holds the recording medium P on which an image is formed and supplies the recording medium P to the image former 20. The paper feeder 10 includes a paper feed tray 11 and a conveyer 12.

The paper feed tray 11 is a plate-like member provided so that one or more recording media P can be stacked and placed thereon. The paper feed tray 11 is provided so as to move up and down according to the number of the placed recording media P, and is held at a position that allows the recording media P to be conveyed by the conveyer 12.

The conveyer 12 includes a conveyance mechanism that rotationally drives an annular belt 123 using a plurality of (for example, two) rollers 121 and 122 to convey the recording medium P on the belt 123, and a supplier that transfers the recording medium P placed on the paper feed tray 11 to the belt 123. The conveyer 12 conveys the recording medium P transferred to the belt 123 by the supplier using the rotation operation of the belt 123.

The image former 20 ejects ink onto the conveyed recording medium P to form an image. The image former 20 includes a transfer unit 22, a sheet heater 23, an image forming drum 21, an inkjet head 24, an irradiator 25, and a deliverer 26.

The transfer unit 22 is provided at a position between the conveyer 12 of the paper feeder 10 and the image forming drum 21 and transfers the recording medium P conveyed by the conveyer 12 to the image forming drum 21. The transfer unit 22 includes, for example, a swing arm 221 that carries one end of the recording medium P conveyed by the conveyer 12 and a cylindrical transfer drum 222 that transfers the recording medium P carried on the swing arm 221 to the image forming drum 21. The transfer unit 22 picks up the recording medium P on the conveyer 12 by the swing arm 221 to transfer it to the transfer drum 222, guides the recording medium P in the direction along the outer peripheral surface of the image forming drum 21, and transfers it to the image forming drum 21.

The sheet heater 23 heats the recording medium P carried on the image forming drum 21. The sheet heater 23 has, for example, an infrared heater or the like and generates heat in response to energization. The sheet heater 23 is provided in the vicinity of the outer peripheral surface of the image forming drum 21 on the upstream side of the inkjet head 24 in the conveying direction of the recording medium P by the rotation of the image forming drum 21. The generation of heat by the sheet heater 23 is controlled by the controller 40 such that the recording medium P carried on the image forming drum 21 and passing near the sheet heater 23 has a predetermined temperature.

The image forming drum 21 carries the recording medium P along its cylindrical outer peripheral surface and conveys the recording medium P by being rotated. The conveying surface of the image forming drum 21 faces the sheet heater 23, the inkjet head 24, and the irradiator 25 so that processes related to image formation are sequentially performed on the recording medium P conveyed.

The inkjet head 24 ejects ink onto the recording medium P carried on the image forming drum 21 to form an image. The inkjet heads 24 are individually provided for various colors: cyan (C), magenta (M), yellow (Y), and black (K). In FIG. 1, the inkjet heads 24 corresponding to the respective colors of Y, M, C, and K are sequentially provided in order from the upstream side with respect to the conveying direction of the recording medium P conveyed by the rotation of the image forming drum 21.

The inkjet head 24 is provided with a length (width) that covers the entire width of the recording medium P in the direction (width direction) perpendicular to the conveying direction of the recording medium P. That is, the inkjet recording apparatus 1 according to one or more embodiments is a one-pass line head type inkjet recording apparatus. The inkjet head 24 can be configured as a line head by arranging a plurality of recording heads.

After ink is ejected onto the recording medium P by the inkjet head 24, the irradiator 25 irradiates the recording medium P with energy rays for curing the ink. The irradiator 25 has a fluorescent tube such as a low-pressure mercury lamp, for example, and causes the fluorescent tube to emit light to radiate energy rays such as ultraviolet rays. The irradiator 25 is provided in the vicinity of the outer peripheral surface of the image forming drum 21 on the downstream side of the inkjet head 24 in the conveying direction of the recording medium P by the rotation of the image forming drum 21. The irradiator 25 radiates energy rays to the recording medium P carried on the image forming drum 21 and subjected to ink ejection, and cures the ink ejected onto the recording medium P by the action of energy rays.

The fluorescent tube that emits ultraviolet rays may be, instead of a low-pressure mercury lamp, a mercury lamp having an operating pressure of about several hundred Pa to 1 MPa, a light source usable as a sterilizing lamp, a cold cathode tube, an ultraviolet laser light source, a metal halide lamp, a light emitting diode, or the like. Among them, a light source (for example, a light emitting diode or the like) that can radiate ultraviolet rays with higher illuminance and consumes less power is desirable. Energy rays are not limited to ultraviolet rays. Energy rays only need to have the property of curing ink according to the property of the ink, and the light source can also be selected according to the wavelength of energy rays or the like.

The deliverer 26 conveys the recording medium P irradiated with energy rays by the irradiator 25 from the image forming drum 21 to the paper discharger 30. The deliverer 26 includes a conveyance mechanism that rotationally drives an annular belt 263 using a plurality of (for example, two) rollers 261 and 262 to convey the recording medium P on the belt 263, and a cylindrical transfer drum 264 that transfers the recording medium P from the image forming drum 21 to the conveyance mechanism. The deliverer 26 conveys, on the belt 263, the recording medium P delivered to the belt 263 by the transfer drum 264, and delivers it to the paper discharger 30.

The paper discharger 30 stores the recording medium P delivered from the image former 20 by the deliverer 26. The paper discharger 30 has a plate-like paper discharge tray 31 and the like, and stacks and places recording media P with formed images on the paper discharge tray 31.

The ink supplier 50 stores ink, supplies the ink to the inkjet head 24 of the image former 20, and enables the ink of each color to be ejected from the nozzles of the inkjet head 24.

The ink used in the inkjet recording apparatus 1 of one or more embodiments is not limited, but is, for example, ultraviolet (UV) curable ink. The ultraviolet curable ink undergoes a phase change between a gel state and a sol (liquid) state depending on the temperature while ultraviolet rays are not radiated. For example, the phase change temperature of this ink is a predetermined temperature ranging from 40° C. to 100° C., for example, and uniformly solates (liquefies) by being heated to this phase change temperature or higher. On the other hand, this ink gels at a temperature equal to or lower than a predetermined temperature including ordinary room temperature (0° C. to 30° C.).

Ultraviolet curable ink polymerizes and cures not only by ultraviolet rays but also by heat. Polymerization of ultraviolet curable ink is suppressed, for example, by a polymerization inhibitor contained in the ultraviolet curable ink. However, since the polymerization inhibitor is consumed by heat, polymerization occurs when the polymerization inhibitor is consumed completely. Polymerization causes clogging of the hollow interior of a hollow fiber bundle 242e in a degassing apparatus 242 described below. Therefore, in the case of using ultraviolet curable ink, the effect of using the degassing apparatus according to one or more embodiments of the present invention is particularly remarkable.

Figure 2:
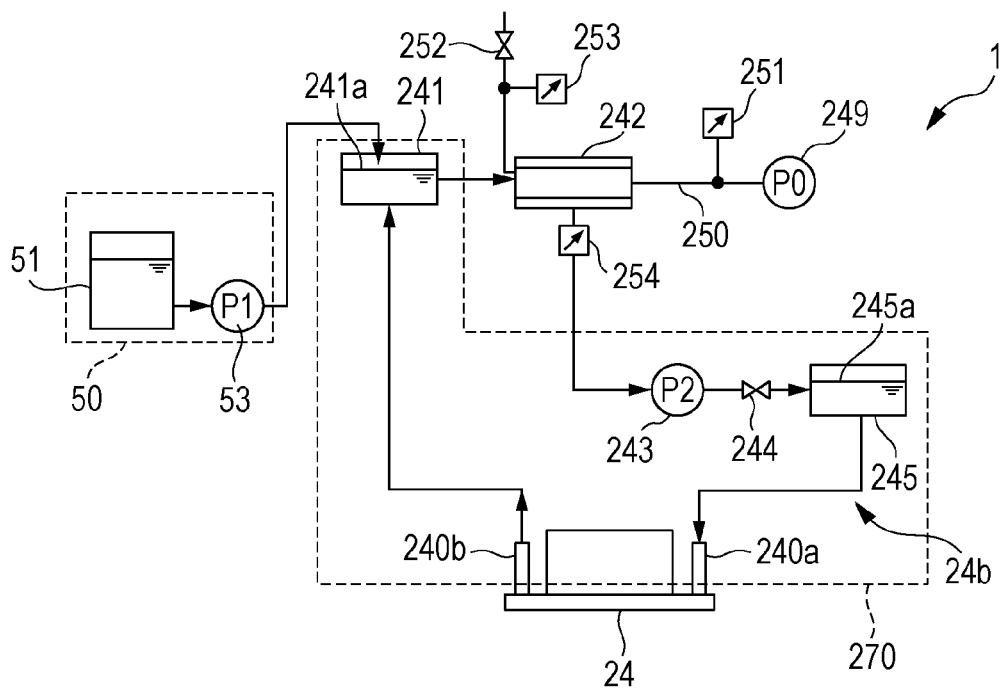
FIG. 2 is a schematic diagram illustrating an ink flow path of the inkjet recording apparatus illustrated in FIG. 1.

FIG. 2 is a schematic diagram illustrating an ink flow path of the inkjet recording apparatus illustrated in FIG. 1.

In the inkjet recording apparatus 1 of one or more embodiments, as illustrated in FIG. 2, the ink pumped out by a supply pump 53 from an ink tank 51 of the ink supplier 50 is supplied to a first sub tank 241 on an ink flow path 24b, and is supplied from the first sub tank 241 to each inkjet head 24 via the ink flow path 24b.

The ink flow path 24b forms a circulation path so that the ink that has not been ejected by each inkjet head 24 can be returned to the first sub tank 241 as needed. The ink in the first sub tank 241 is sent to the second sub tank 245 via the degassing apparatus 242, a liquid feed pump 243, and a check valve 244. The ink sent to the second sub tank 245 is supplied to an inlet 240a of each inkjet head 24. The ink that has not been ejected by each inkjet head 24 is returned from an outlet 240b of each inkjet head 24 to the first sub tank 241.

The first sub tank 241 is an ink chamber whose volume is smaller than that of the ink tank 51 and which stores the ink pumped out from the ink tank 51 by the supply pump 53. The first sub tank 241 is provided with a first float sensor 241a, and the controller 40 operates the supply pump 53 based on data of the liquid level position detected by the first float sensor 241a, whereby a predetermined amount of ink is stored.

The second sub tank 245 is a small ink chamber in which the ink degassed by the degassing apparatus 242 is temporarily stored. The capacity of the second sub tank 245 is not limited, but is substantially the same as that of the first sub tank 241. The amount of ink supplied from the second sub tank 245 to the inlet 240a of each inkjet head 24 corresponds to the amount of ink ejected from the nozzles of each inkjet head 24. The second sub tank 245 is provided with a second float sensor 245a, and the controller 40 operates the liquid feed pump 243 based on data of the liquid level position detected by the second float sensor 245a, whereby a predetermined amount of ink is stored.

The inkjet heads 24 and the ink flow path 24b are heated and kept warm by an ink heater 270 including a heater and a heat transfer member for transmitting heat from the heater, so that the temperature of ink can be kept at an appropriate temperature. The heater of the ink heater 270 includes, for example, a heating wire, and generates Joule heat when energized. The heat transfer member includes a member having a high thermal conductivity such as a heat conduction plate formed of various metals (alloys). The heat transfer member is provided to cover the piping of the ink flow path 24b or provided in contact with the side wall of the first sub tank 241 or the second sub tank 245.

The degassing apparatus 242 is connected to a vacuum pump 249 for reducing the air pressure in the degassing apparatus 242 via a vacuum path 250, a first pressure sensor 251 for measuring the air pressure inside the flow path in the vicinity of the vacuum pump 249, an atmospheric release valve 252 capable of switching the inside of the degassing apparatus 242 between an airtight state and an open air state, and a second pressure sensor 253 for measuring the air pressure inside the flow path in the vicinity of the atmospheric release valve 252. The atmospheric release valve 252 is an electromagnetic valve that operates in accordance with an operation command from the controller 40.

In the vicinity of the degassing apparatus 242 on the ink flow path 24b, an ink flow rate sensor 254 for detecting the flow rate of the ink is provided.

Figure 3:
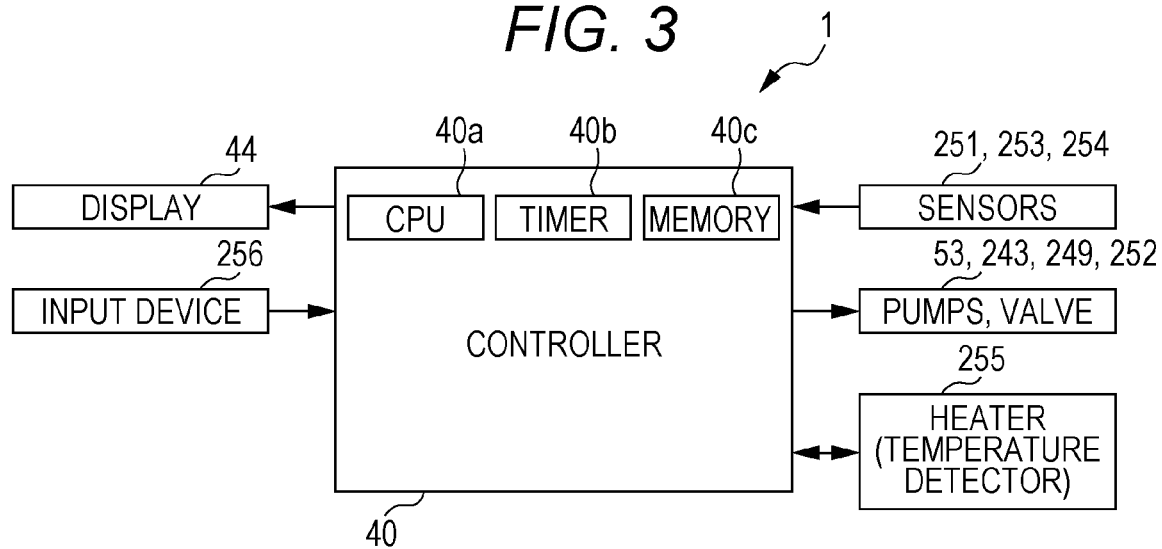
FIG. 3 is a block diagram of the inkjet recording apparatus illustrated in FIG. 1.

FIG. 3 is a block diagram of the inkjet recording apparatus illustrated in FIG. 1.

In the inkjet recording apparatus 1, as illustrated in FIG. 3, the controller 40 includes a CPU 40a, a timer 40b, and a memory 40c. The controller 40 stores input signals in the memory 40c, performs predetermined signal processes at the CPU 40a, and outputs various processed signals. In signal processes, the controller 40 can use time information measured by the timer 40b.

The results of detection of pressure and flow rate are input from the first and second pressure sensors 251, 253 and the ink flow rate sensor 254 to the controller 40. Manual input signals are also input from an input device 256 to the controller 40. The controller 40 outputs control signals to the supply pump 53, the liquid feed pump 243, the vacuum pump 249, and the atmospheric release valve 252 to control the operation of these pumps and the valve. The controller 40 also outputs a display signal to a display such as a display 44, e.g., an LCD, to display a certain item. The controller 40 further inputs and outputs signals to and from a heater 255 having a temperature detector, and maintains the temperature of the ink heater 270 at a predetermined temperature.

In the inkjet recording apparatus described above, four inkjet heads 24 are provided for the respective colors of C, M, Y, and K. However, the number of inkjet heads 24 is not limited, and a larger number of inkjet heads may be provided for more colors.

In the inkjet recording apparatus described above, the recording medium P is conveyed by the rotation of the image forming drum 21. Alternatively, a belt, a roller, or the like may be used to convey the recording medium P while maintaining it in a flat state.

Although the above-described inkjet recording apparatus is of a one-pass type, it may be of a scan type for causing the inkjet heads to perform scanning.

In the above-described inkjet recording apparatus, ultraviolet curable ink is used. However, the ink is not limited, and any pigment ink and various other inks that can cause clogging in the hollow interior may be used.

Figure 4:
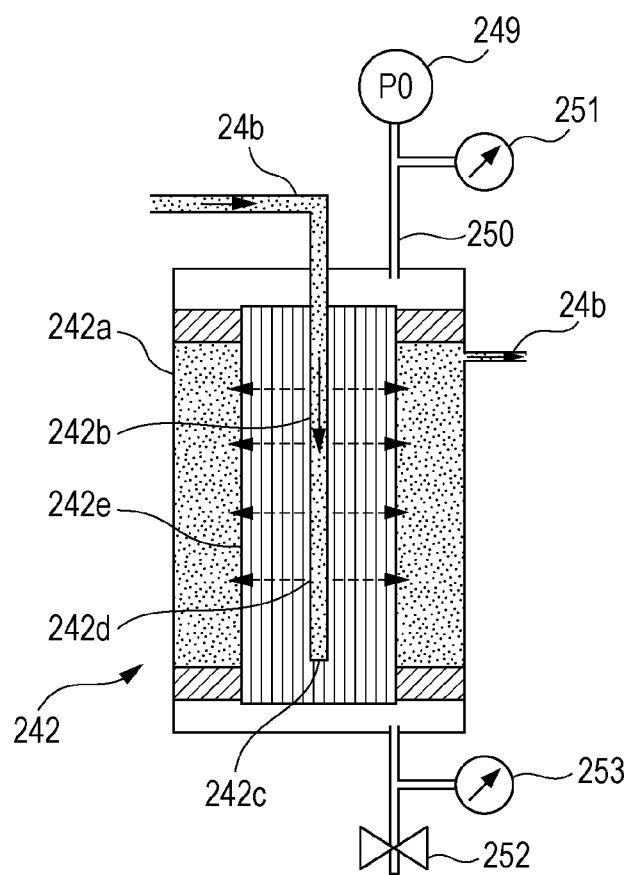
FIG. 4 is a cross-sectional diagram of a degassing apparatus according to one or more embodiments.

FIG. 4 is a cross-sectional diagram of the degassing apparatus according to one or more embodiments.

As illustrated in FIG. 4, for example, the degassing apparatus 242 has a cylindrical outer shell 242a. The degassing apparatus 242 removes (degasses) the dissolved gas in the ink which is the liquid flowing into the outer shell 242a from the ink flow path 24b on the upstream side, and discharges the degassed ink from the outer shell 242a to the ink flow path 24b on the downstream side. In the outer shell 242a of the degassing apparatus 242, one end of a central tube 242b is connected to the ink flow path 24b on the upstream side, and the central tube 242b is surrounded and covered by the hollow fiber bundle 242e having a large number of hollow fibers. The other end of the central tube 242b is sealed by a plug 242c. Numerous thin holes 242d (perforated holes) are provided in the outer peripheral surface of the central tube 242b. The ink flowing in from the ink flow path 24b on the upstream side flows out from these thin holes 242d to the surroundings, comes into contact with (perfuses over) the exterior of each hollow fiber forming the hollow fiber bundle 242e, and is discharged to the ink flow path 24b on the downstream side.

Each of the hollow fibers forming the hollow fiber bundle 242e is a hollow fine yarn having a hollow interior, and its membrane surface has gas permeability. One end (upper end in FIG. 4) of the hollow interior of the hollow fiber bundle 242e is connected to the vacuum pump 249 via the vacuum path 250. The other end (lower end in FIG. 4) of the hollow interior of the hollow fiber bundle 242e is closed by the atmospheric release valve 252. With the atmospheric release valve 252 closed, air in the hollow interior is sucked by the vacuum pump 249, whereby the hollow interior is depressurized. In this state, when the ink comes into contact with the membrane surface (exterior of hollow fibers) of the hollow fiber bundle 242e, only the dissolved gas in the ink permeates selectively through the hollow interior, and the ink is degassed.

The first pressure sensor 251 detects the air pressure inside the flow path in the vicinity of the vacuum pump 249 and outputs the result to the controller 40. The second pressure sensor 253 detects the air pressure inside the flow path in the vicinity of the atmospheric release valve 252 and outputs the result to the controller 40. The controller 40 drives and controls the vacuum pump 249 based on the detection results provided by the first and second pressure sensors 251 and 253.

The degassing apparatus 242 is provided with a clogging detector for detecting clogging of the hollow interior of the hollow fibers forming the hollow fiber bundle 242e caused by components in the ink. In one or more embodiments, the clogging detector is the first and second pressure sensors 251 and 253 and the controller 40. The detection results provided by these pressure sensors 251 and 253 are input to the controller 40, and the controller 40 executes a predetermined operation to detect clogging.

In one or more embodiments, when sucking from one end (side close to the vacuum pump 249) of the hollow interior of the hollow fibers forming the hollow fiber bundle 242e for depressurization of the hollow interior, the controller 40 detects clogging of the hollow interior based on the difference in intra-pipe air pressure between this one end and the other end (side close to the atmospheric release valve 252) of the hollow interior.

Figure 5:
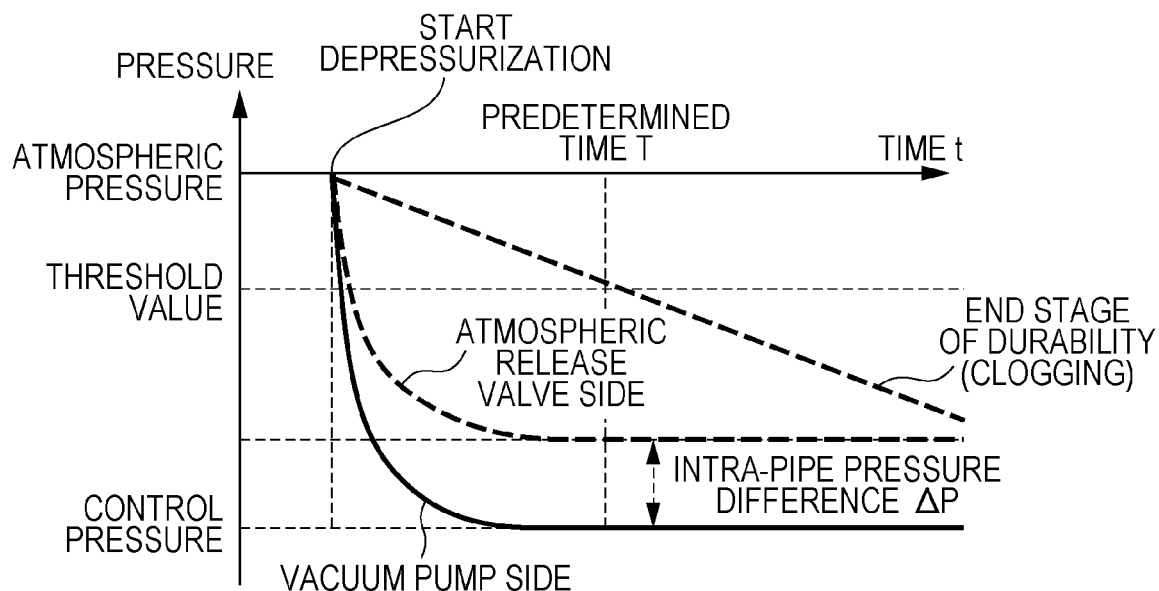
FIG. 5 is a graph illustrating the relationship between the difference in pressure between one end and the other end of a hollow fiber bundle and the elapsed time according to one or more embodiments.

FIG. 5 is a graph illustrating the relationship between the difference in pressure between one end and the other end of a hollow fiber bundle and the elapsed time according to one or more embodiments.

As illustrated in FIG. 5, when depressurizing the hollow interior of the hollow fibers forming the hollow fiber bundle 242e, the intra-pipe pressure at one end (side close to the vacuum pump 249) of the hollow interior rapidly decreases. At this time, the intra-pipe pressure at the other end (side close to the atmospheric release valve 252) of the hollow interior decreases later than that at the one end. This is because it takes time for the air in the hollow interior to move. This time difference corresponds to the intra-pipe pressure difference $\Delta P$ between the one end and the other end at a predetermined time T from the start of depressurization. That is, if the time for the air in the hollow interior to move is short, the intra-pipe pressure difference $\Delta P$ at the predetermined time T is small, and if the time for the air in the hollow interior to move is long, the intra-pipe pressure difference $\Delta P$ at the predetermined time T is large. The time for the air in the hollow interior to move is short unless the hollow interior is clogged, and becomes longer as the hollow interior becomes more clogged. Therefore, by detecting the magnitude of the intra-pipe pressure difference $\Delta P$ at the predetermined time T, it is possible to detect the degree of clogging in the hollow interior.

If the intra-pipe pressure difference $\Delta P$ at the predetermined time T is less than a threshold value (for example, 60 kPa), the controller 40 determines that there is no clogging in the hollow interior. If the intra-pipe pressure difference $\Delta P$ at the predetermined time T is equal to or greater than the threshold value, the controller 40 determines that the hollow interior is clogged.

Clogging in the hollow interior as used herein does not mean that the entire hollow interior of the hollow fiber bundle 242e is completely clogged and the air in the hollow interior does not move at all, but means that the time for the air in the hollow interior to move becomes longer than a predetermined time and the hollow fiber bundle 242e should be replaced with an unused one.

Figure 6:
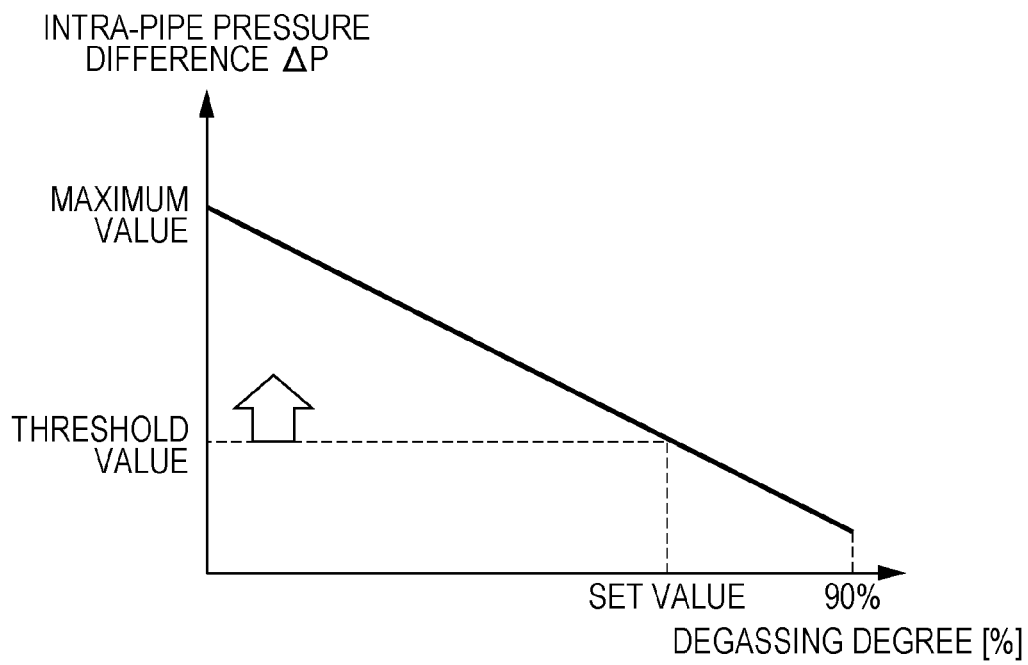
FIG. 6 is a graph illustrating the relationship between the difference in pressure between one end and the other end of a hollow fiber bundle and the degassing degree according to one or more embodiments.

FIG. 6 is a graph illustrating the relationship between the difference in pressure between one end and the other end of a hollow fiber bundle and the degassing degree according to one or more embodiments.

The relationship between the intra-pipe pressure difference ΔP between the one end and the other end of the hollow interior and the degassing degree of the ink is illustrated in FIG. 6: The degassing degree increases as the intra-pipe pressure difference ΔP is decreases. This relationship means that as the hollow interior becomes more clogged, the intra-pipe pressure difference ΔP increases and the degassing degree decreases. Therefore, if the intra-pipe pressure difference ΔP is less than a threshold value (for example, 30 kPa), the controller 40 can determine that the degassing degree exceeds a set value (for example, 75%) and that there is no clogging in the hollow interior. If the intra-pipe pressure difference ΔP is equal to or greater than the threshold value, the controller 40 can determine that the hollow interior is clogged.

In response to determining that the hollow interior of the hollow fiber bundle 242e is clogged (if the result of detection of clogging is input to the controller 40 by the clogging detector), the controller 40 causes the display 44 to display an indication of clogging of the hollow interior.

Figure 7:
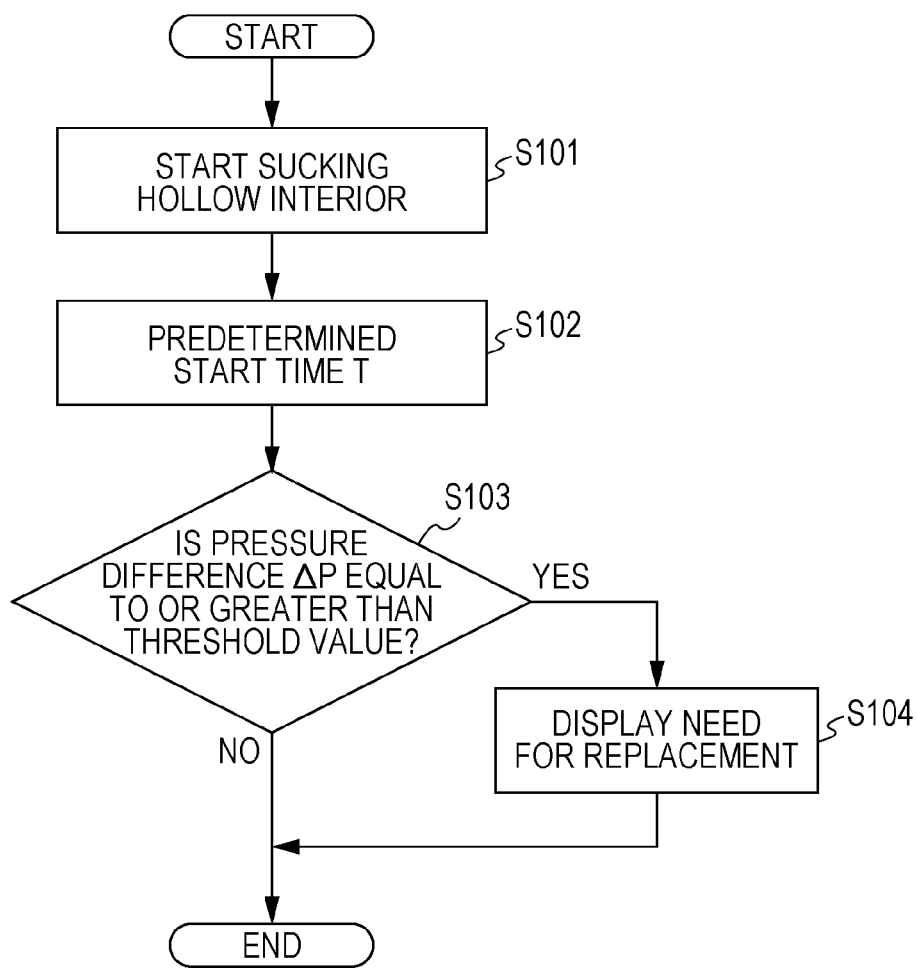
FIG. 7 is a flowchart illustrating the operation of a controller according to one or more embodiments.

FIG. 7 is a flowchart illustrating the operation of the controller in one or more embodiments.

A control process executed by the controller 40 of the inkjet recording apparatus 1 including the degassing apparatus 242 configured as described above will be described with reference to FIG. 7.

While the atmospheric release valve 252 is closed, the controller 40 starts sucking the hollow interior of the hollow fiber bundle 242e by the vacuum pump 249 (step S101).

The controller 40 continues sucking over the predetermined time T (step S102).

The controller 40 detects the intra-pipe pressure at one end (side close to the vacuum pump 249) of the hollow interior and the intra-pipe pressure at the other end (side close to the atmospheric release valve 252), and determines whether the pressure difference ΔP is equal to or greater than the threshold value (step S103). If the pressure difference ΔP is equal to or greater than the threshold value, the process proceeds to step S104. If the pressure difference ΔP is less than the threshold value, the process is terminated.

The controller 40 displays an indication that the hollow interior of the hollow fiber bundle 242e is clogged and the hollow fiber bundle 242e (degassing apparatus 242) should be replaced with an unused one (step S104).

The controller 40 can also operate as a clogging predictor (processor) that predicts clogging of the hollow interior based on detection of clogging in the hollow interior of the hollow fiber bundle 242e. When clogging in the hollow interior is predicted, the controller 40 causes the display 44 to display an indication that the clogging of the hollow interior has been predicted.

Figure 8:
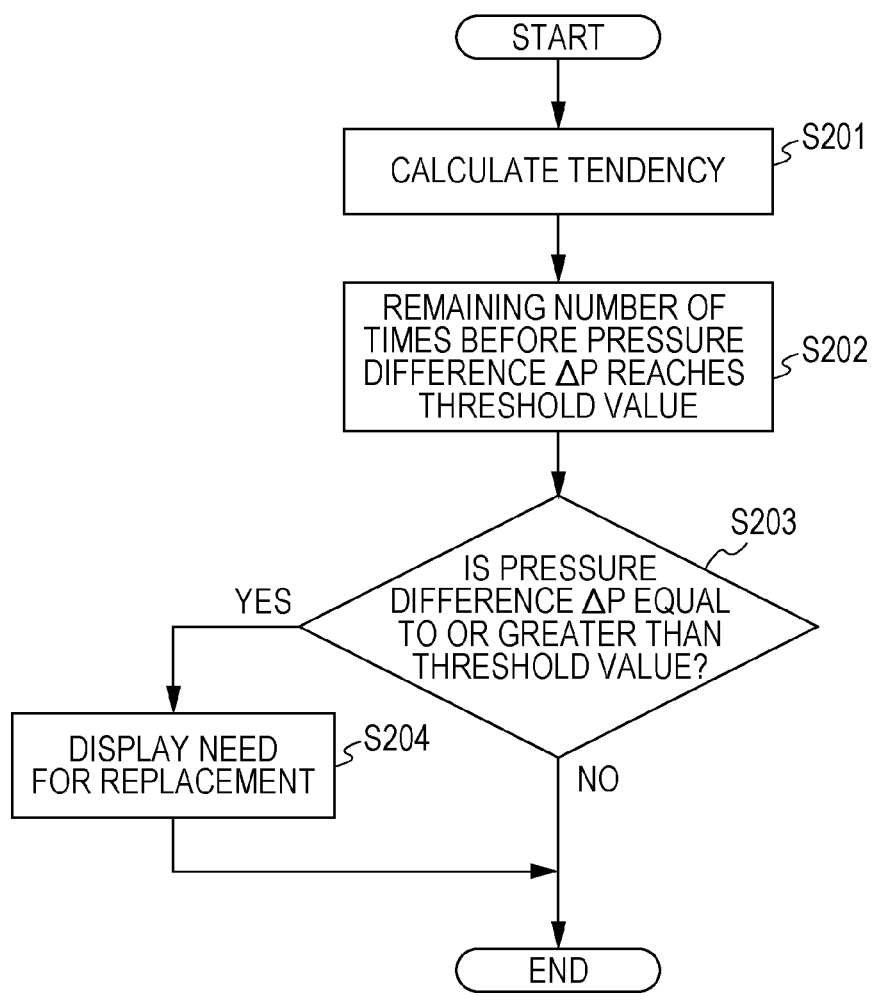
FIG. 8 is a flowchart illustrating another example (clogging prediction) of the operation of the controller according to one or more embodiments.

FIG. 8 is a flowchart illustrating another example (clogging prediction) of the operation of the controller in one or more embodiments.

In this case, as illustrated in FIG. 8, the controller 40 records the difference between the pressure difference ΔP and the threshold value every time the suction of the hollow interior of the hollow fiber bundle 242e is started, and calculates the tendency for this difference to decrease (step S201). For example, by sequentially recording the differences between the pressure differences ΔP and the threshold value from the first suction to the m-th suction and plotting these differences, it can be predicted that the difference becomes zero at the n-th suction (n>m).

The controller 40 displays information indicating how many suctions are required before the difference between the pressure difference ΔP and the threshold value becomes zero (step S202).

The controller 40 determines whether the pressure difference ΔP is equal to or greater than the threshold value (step S203). If the pressure difference ΔP is equal to or greater than the threshold value, the process proceeds to step S204. If the pressure difference ΔP is less than the threshold value, the process is terminated.

The controller 40 displays an indication that the hollow interior of the hollow fiber bundle 242e is clogged and the hollow fiber bundle 242e (degassing apparatus 242) should be replaced with an unused one (step S204).

When opening the depressurized hollow interior of the hollow fiber bundle 242e to the atmosphere, the controller 40 may detect clogging of the hollow interior based on the time that elapses before the air pressure of the hollow interior reaches a certain air pressure.

Figure 9:
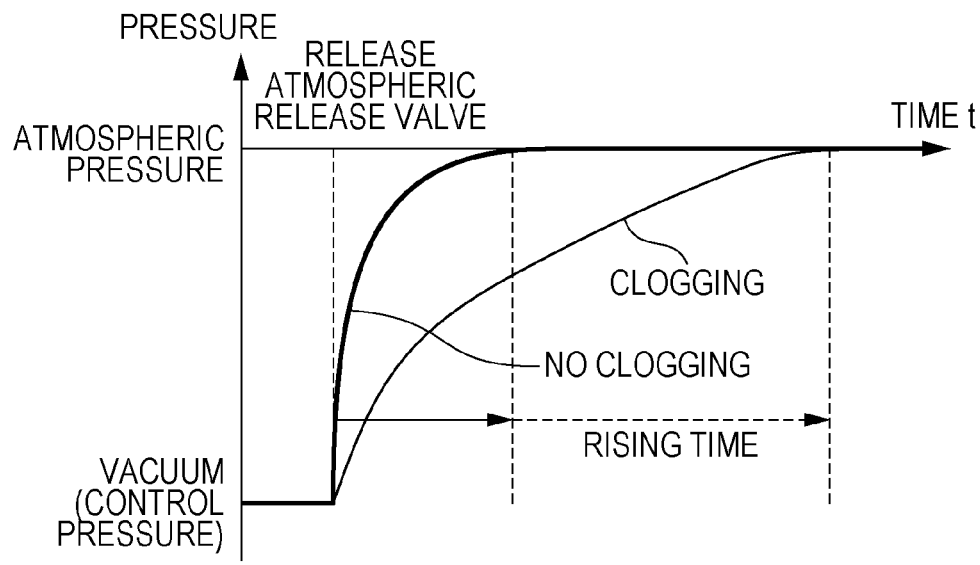
FIG. 9 is a graph illustrating the relationship between the pressure at the other end and the elapsed time established when the hollow interior of a hollow fiber bundle is opened to the atmosphere according to one or more embodiments.

FIG. 9 is a graph illustrating the relationship between the pressure at the other end and the elapsed time established when the hollow interior of a hollow fiber bundle is opened to the atmosphere according to one or more embodiments.

As illustrated in FIG. 9, when the hollow interior of the depressurized hollow fiber bundle 242e is opened to the atmosphere, the intra-pipe pressure at the other end (side close to the atmospheric release valve 252) of the hollow interior rapidly rises. At this time, the intra-pipe pressure at the one end (side close to the vacuum pump 249) of the hollow interior rises later than that at the other end. This is because it takes time for the air in the hollow interior to move. If the time for the air in the hollow interior to move is short, the time for the intra-pipe pressure at the one end of the hollow interior to rise to the atmospheric pressure is short. If the time for the air in the hollow interior to move is long, the time for the intra-pipe pressure at the one end of the hollow interior to rise to the atmospheric pressure is long. The time for the air in the hollow interior to move is short unless the hollow interior is clogged, and becomes longer as the hollow interior becomes more clogged. Therefore, by detecting the time that elapses before the intra-pipe pressure at the one end of the hollow interior rises to the atmospheric pressure after the atmospheric release valve 252 is opened, it is possible to detect the degree of clogging in the hollow interior.

If the time required for opening to the atmosphere is less than a threshold value (for example, 15 seconds), the controller 40 determines that there is no clogging in the hollow interior. If the time required for opening to the atmosphere is equal to or greater than the threshold value, the controller 40 determines that the hollow interior is clogged.

Figure 10:
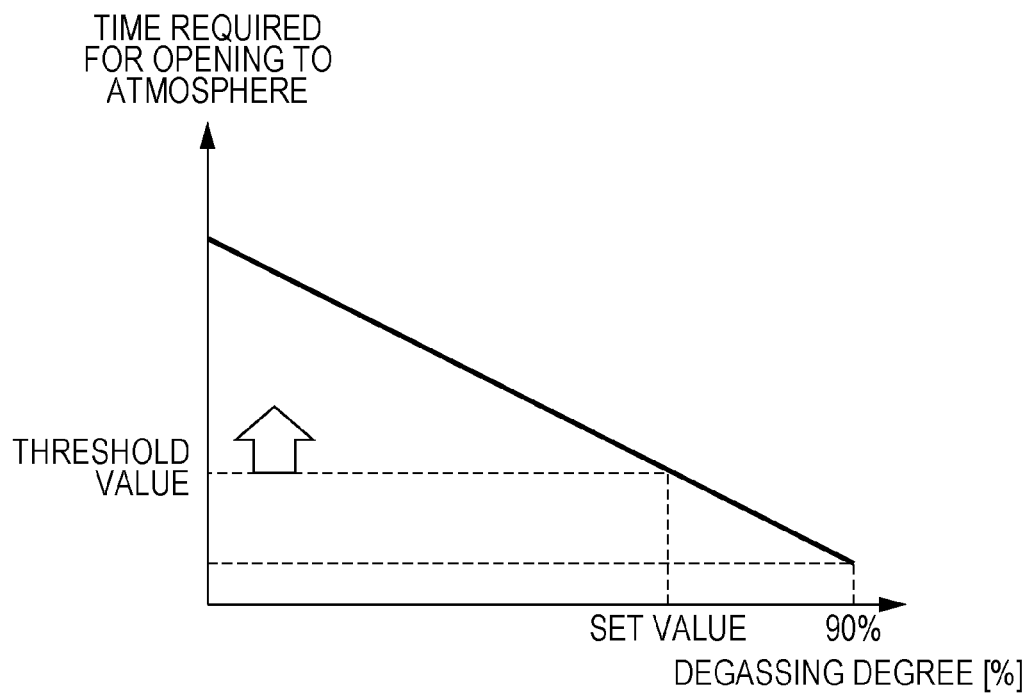
FIG. 10 is a graph illustrating the relationship between the time of opening the hollow interior of a hollow fiber bundle to the atmosphere and the degassing degree according to one or more embodiments.

FIG. 10 is a graph illustrating the relationship between the time of opening the hollow interior of a hollow fiber bundle to the atmosphere and the degassing degree according to one or more embodiments.

The relationship between the time of opening of the hollow interior of the hollow fiber bundle 242e to the atmosphere and the degassing degree of the ink is illustrated in FIG. 10: The time required for opening to the atmosphere increases as the degassing degree increases. This relationship means that as the hollow interior becomes more clogged, the time required for opening to the atmosphere increases and the degassing degree decreases. Therefore, if the time required for opening to the atmosphere is less than the threshold value (for example, 15 seconds), the controller 40 can determine that the degassing degree exceeds the set value (for example, 75%) and that there is no clogging in the hollow interior. If the time required for opening to the atmosphere is equal to or greater than the threshold value, the controller 40 can determine that the degassing degree is equal to or less than the set value and that the hollow interior is clogged.

In response to determining that the hollow interior of the hollow fiber bundle 242e is clogged (if the result of detection of clogging is input to the controller 40 by the clogging detector), the controller 40 causes the display 44 to display an indication of clogging of the hollow interior.

Figure 11:
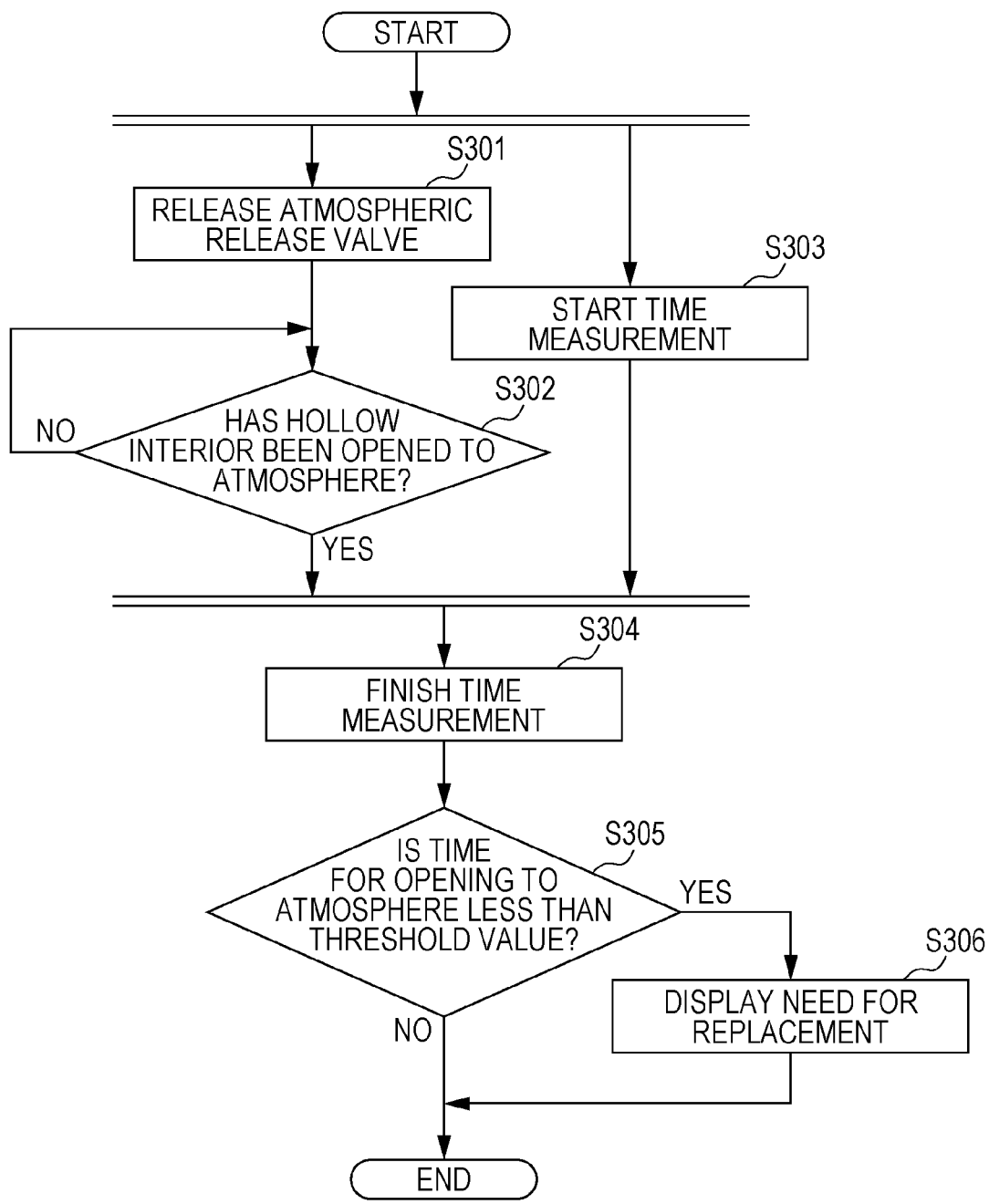
FIG. 11 is a flowchart illustrating the operation of the controller according to one or more embodiments.

FIG. 11 is a flowchart illustrating the operation of the controller in one or more embodiments.

In this case, as illustrated in FIG. 11, the controller 40 releases the atmospheric release valve 252 while the hollow interior of the hollow fiber bundle 242e is depressurized (evacuated) (step S301).

The controller 40 determines whether the hollow interior has been opened to the atmosphere (step S302). If the hollow interior has been opened to the atmosphere, the process proceeds to step S304. If the hollow interior has not been opened to the atmosphere, the process returns to step S302.

Meanwhile, the controller 40 starts time measurement simultaneously with the release of the atmospheric release valve 252 (step S303).

The controller 40 finishes the time measurement (step S304).

The controller 40 determines whether the time taken from the release of the atmospheric release valve 252 to the opening of the hollow interior to the atmosphere is less than the threshold value (step S305). If the time is not less than the threshold value, the process proceeds to step S306. If the time is less than the threshold value, the process is terminated.

The controller 40 displays an indication that the hollow interior of the hollow fiber bundle 242e is clogged and the hollow fiber bundle 242e (degassing apparatus 242) should be replaced with an unused one (step S306).

The controller 40 may detect clogging of the hollow interior based on the flow velocity of the air in the hollow interior of the depressurized hollow fiber bundle 242e when the hollow interior is opened to the atmosphere.

Figure 12:
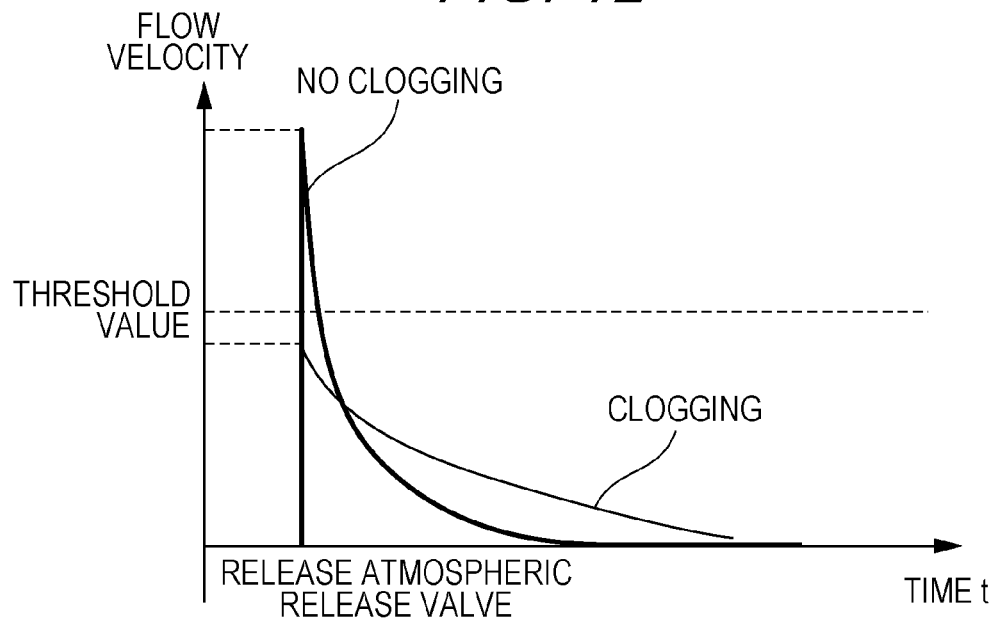
FIG. 12 is a graph illustrating the relationship between the flow velocity of the air in the hollow interior of a hollow fiber bundle and the elapsed time according to one or more embodiments.

FIG. 12 is a graph illustrating the relationship between the flow velocity of the air in the hollow interior of a hollow fiber bundle and the elapsed time according to one or more embodiments.

As illustrated in FIG. 12, when the hollow interior of the depressurized (evacuated) hollow fiber bundle 242e is opened to the atmosphere, the flow velocity of the air in the hollow interior rapidly rises and gradually decreases. The maximum value of the flow velocity of the air in the hollow interior is large unless the hollow interior is clogged, and becomes smaller as the hollow interior becomes more clogged. Therefore, by detecting the maximum value of the flow velocity of the air in the hollow interior after releasing the atmospheric release valve 252, it is possible to detect the degree of clogging in the hollow interior.

If the maximum velocity of the air in the hollow interior exceeds a threshold value (for example, 6 m/sec), the controller 40 determines that there is no clogging in the hollow interior. If the maximum velocity of the air in the hollow interior is equal to or less than the threshold value, the controller 40 determines that the hollow interior is clogged.

Figure 13:
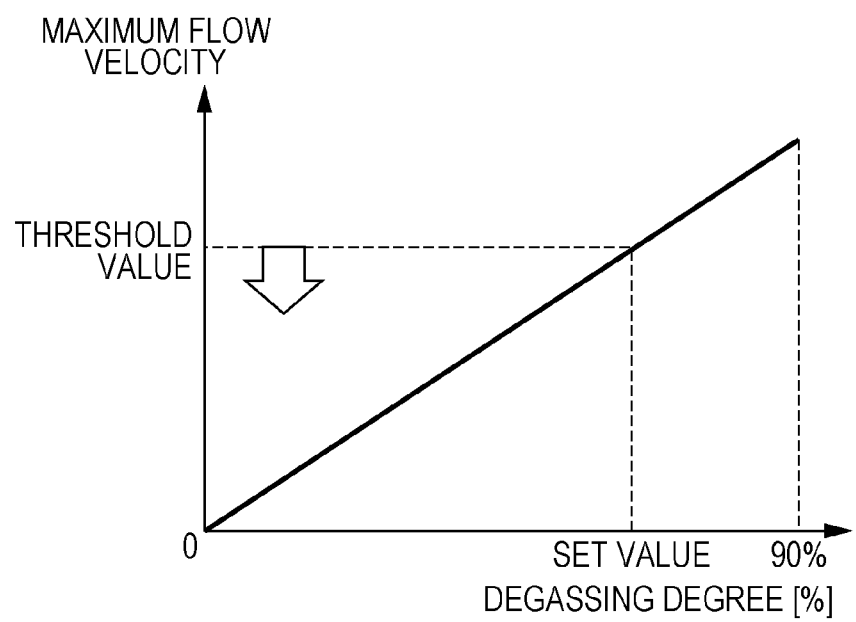
FIG. 13 is a graph illustrating the relationship between the maximum flow velocity of the air in the hollow interior of a hollow fiber bundle and the degassing degree according to one or more embodiments.

FIG. 13 is a graph illustrating the relationship between the maximum flow velocity of the air in the hollow interior of a hollow fiber bundle and the degassing degree according to one or more embodiments.

The relationship between the maximum value of the flow velocity of the air in the hollow interior of the hollow fiber bundle 242e and the degassing degree of the ink is illustrated in FIG. 13: The degassing degree increases as the maximum value of the flow velocity of the air in the hollow interior increases. This relationship means that as the hollow interior becomes more clogged, the maximum value of the flow velocity of the air in the hollow interior decreases and the degassing degree decreases when the hollow interior is opened to the atmosphere. Therefore, if the maximum velocity of the air in the hollow interior exceeds the threshold value (for example, 6 msec) when the hollow interior is opened to the atmosphere, the controller 40 can determine that the degassing degree exceeds the set value (for example, 75%) and that there is no clogging in the hollow interior. If the maximum velocity of the air in the hollow interior is equal to or less than the threshold value, the controller 40 can determine that the degassing degree is equal to or less than the set value and that the hollow interior is clogged.

In response to determining that the hollow interior of the hollow fiber bundle 242e is clogged (if the result of detection of clogging is input to the controller 40 by the clogging detector), the controller 40 causes the display 44 to display an indication of clogging of the hollow interior.

Figure 14:
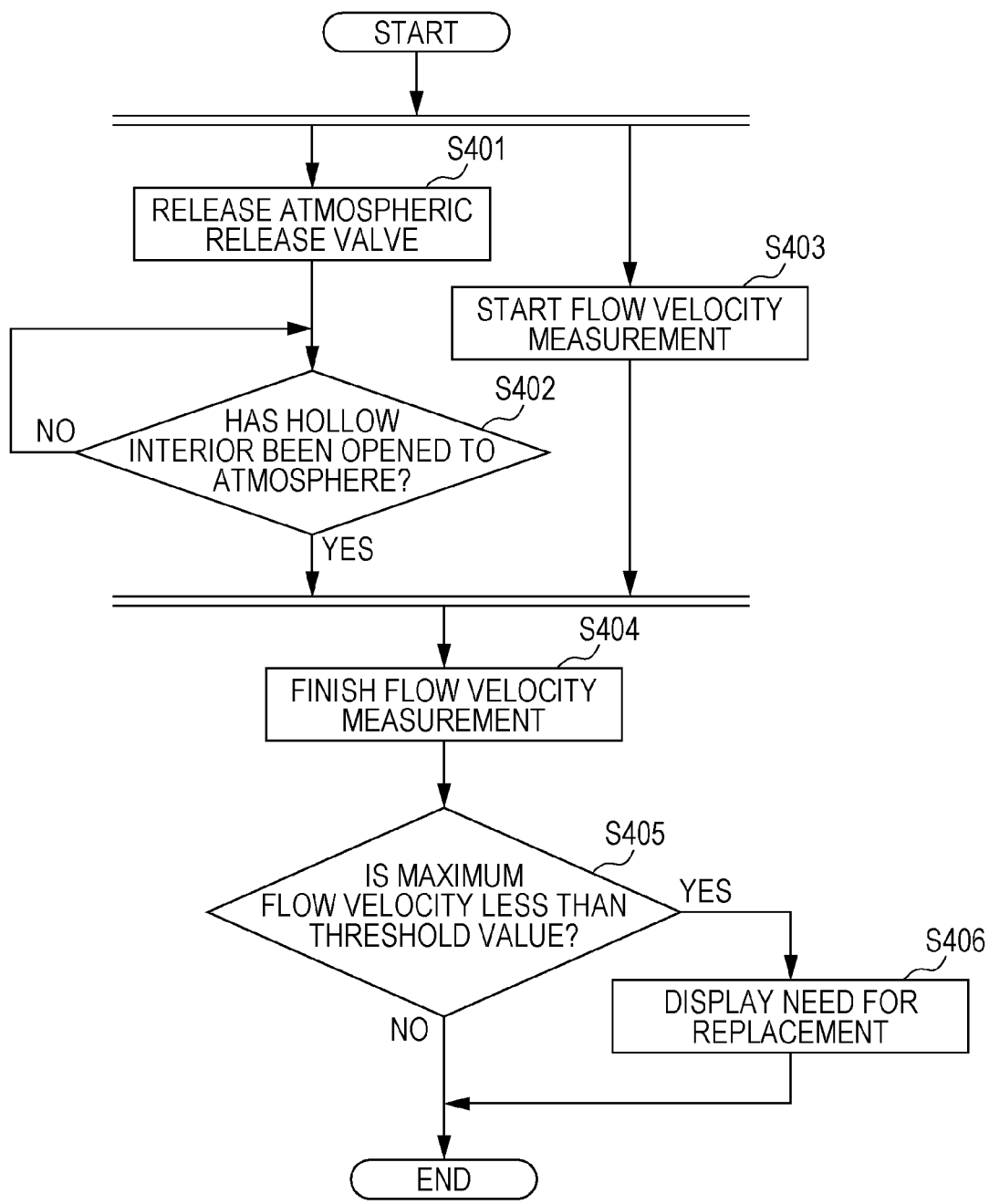
FIG. 14 is a flowchart illustrating the operation of the controller according to one or more embodiments.

FIG. 14 is a flowchart illustrating the operation of the controller in one or more embodiments.

In this case, as illustrated in FIG. 14, the controller 40 releases the atmospheric release valve 252 while the hollow interior of the hollow fiber bundle 242e is depressurized (evacuated) (step S401).

The controller 40 determines whether the hollow interior has been opened to the atmosphere (step S402). If the hollow interior has been opened to the atmosphere, the process proceeds to step S404. If the hollow interior has not been opened to the atmosphere, the process returns to step S402.

Meanwhile, the controller 40 starts the measurement of the flow velocity of the air in the hollow interior simultaneously with the release of the atmospheric release valve 252 (step S403).

The controller 40 finishes the measurement of the flow velocity (step S404).

The controller 40 determines whether the maximum value of the flow velocity of the air in the hollow interior from the release of the atmospheric release valve 252 to the opening of the hollow interior to the atmosphere is less than the threshold value (step S405). If the maximum value is less than the threshold value, the process proceeds to step S406. If the maximum value is not less than the threshold value, the process is terminated.

The controller 40 displays an indication that the hollow interior of the hollow fiber bundle 242e is clogged and the hollow fiber bundle 242e (degassing apparatus 242) should be replaced with an unused one (step S406).

Figure 15:
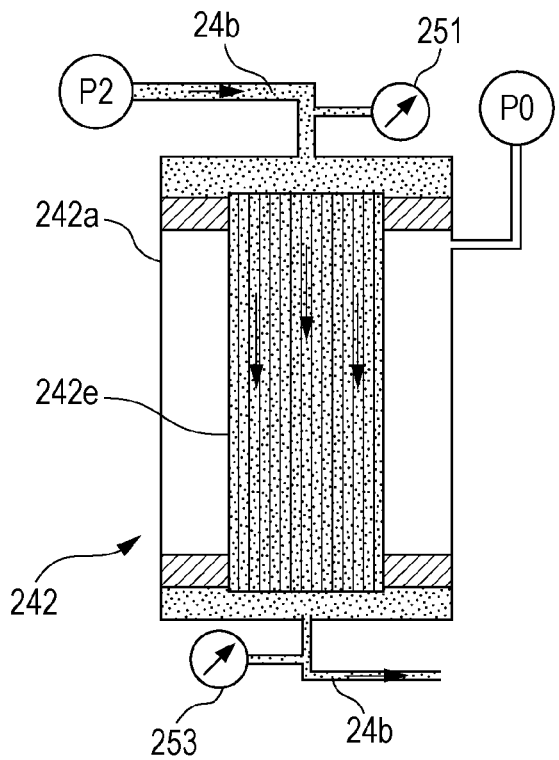
FIG. 15 is a cross-sectional diagram of the degassing apparatus according to one or more embodiments.

FIG. 15 is a cross-sectional diagram of the degassing apparatus according to one or more embodiments.

As illustrated in FIG. 15, the hollow fiber bundle 242e can be used in such a manner that ink is perfused through and brought into contact with the hollow interior of the hollow fiber bundle 242e, and the exterior is depressurized, whereby the dissolved gas in the ink permeates the exterior.

In this case, the controller 40 can detect clogging of the hollow interior based on the difference in ink pressure (difference in total pressure) between one end and the other end of the hollow interior. In one or more embodiments, when sucking from one end (side close to the vacuum pump 249) of the hollow interior of the hollow fibers forming the hollow fiber bundle 242e for depressurization of the hollow interior, the controller 40 detects clogging of the hollow interior based on the difference in intra-pipe air pressure between this one end and the other end (side close to the atmospheric release valve 252) of the hollow interior.

Figure 16:
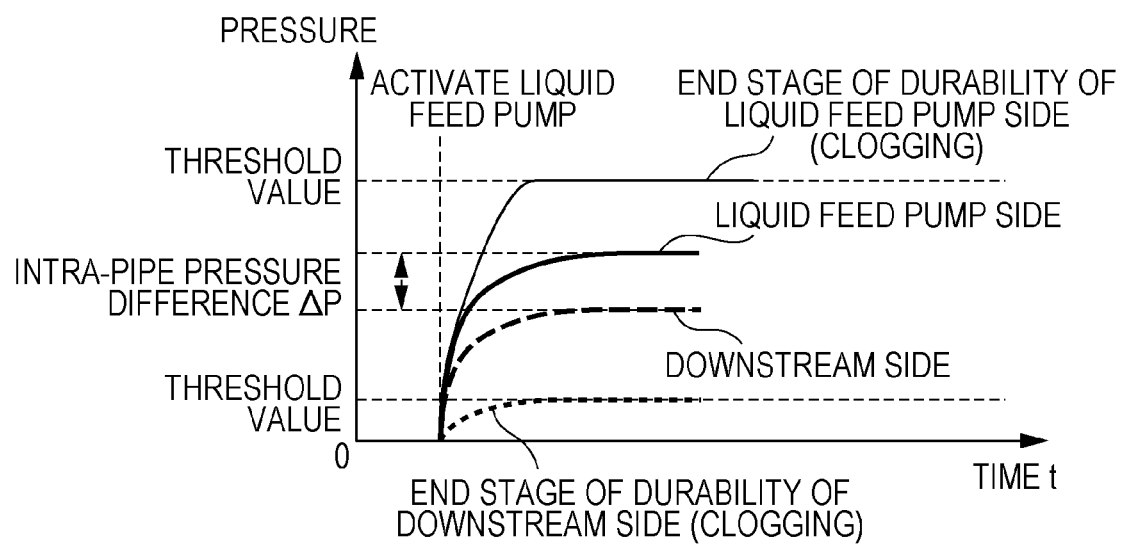
FIG. 16 is a graph illustrating the relationship between the difference in pressure (difference in total pressure) between one end and the other end of a hollow fiber bundle and the elapsed time according to one or more embodiments.

FIG. 16 is a graph illustrating the relationship between the difference in pressure (difference in total pressure) between one end and the other end of a hollow fiber bundle and the elapsed time according to one or more embodiments.

As illustrated in FIG. 16, when the liquid feed pump 243 is activated, the intra-pipe pressure at the one end (side close to the liquid feed pump 243, or upstream side) of the hollow interior rapidly rises. At this time, the intra-pipe pressure at the other end (downstream side) of the hollow interior becomes lower than that at the one end. This is because there is a pressure (dynamic pressure) loss in the hollow interior. The intra-pipe pressure difference $\Delta P$ is small if there is no clogging in the hollow interior and the pressure (dynamic pressure) loss is small. The intra-pipe pressure difference $\Delta P$ becomes larger as the pressure (dynamic pressure) loss increases due to clogging of the hollow interior. Therefore, by detecting the magnitude of the intra-pipe pressure difference $\Delta P$, it is possible to detect the degree of clogging in the hollow interior.

If the intra-pipe pressure difference $\Delta P$ is less than a threshold value (for example, 30 kPa), the controller 40 determines that there is no clogging in the hollow interior. If the intra-pipe pressure difference $\Delta P$ is equal to or greater than the threshold value, the controller 40 determines that the hollow interior is clogged.

In response to determining that the hollow interior of the hollow fiber bundle 242e is clogged (if the result of detection of clogging is input to the controller 40 by the clogging detector), the controller 40 causes the display 44 to display an indication of clogging of the hollow interior.

Figure 17:
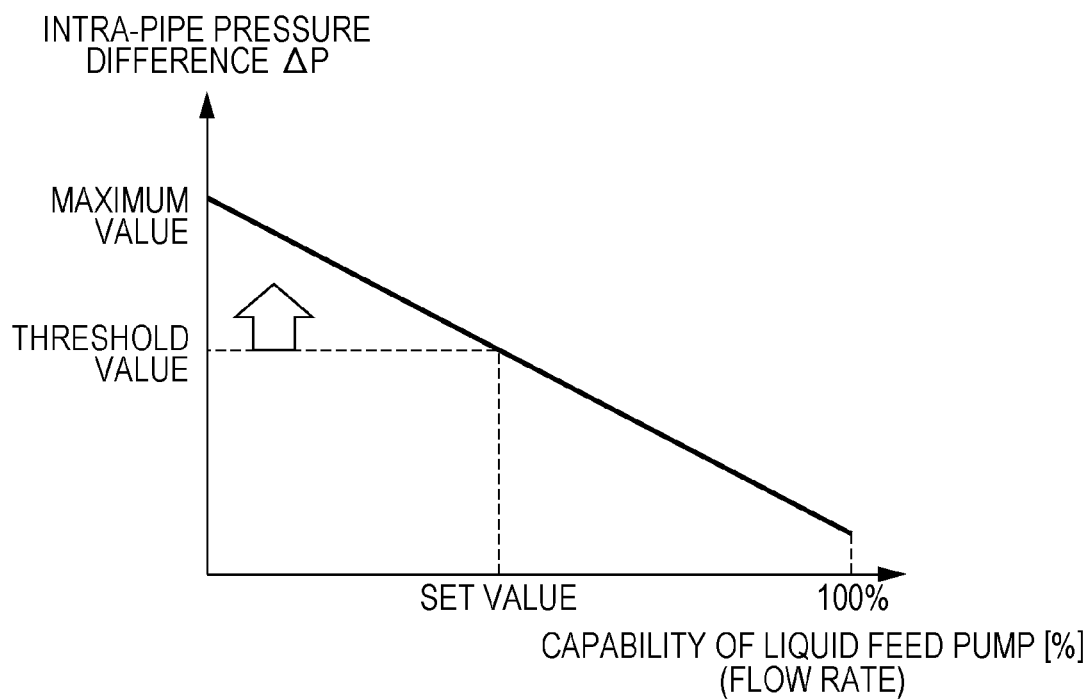
FIG. 17 is a graph illustrating the relationship between the difference in pressure (difference in total pressure) between one end and the other end of a hollow fiber bundle and the capability (flow rate) of a liquid feed pump according to one or more embodiments.

FIG. 17 is a graph illustrating the relationship between the difference in pressure (difference in total pressure) between one end and the other end of a hollow fiber bundle and the capability (flow rate) of a liquid feed pump according to one or more embodiments.

The relationship between the intra-pipe pressure difference $\Delta P$ at the one end (side close to the liquid feed pump 243, or upstream side) and the other end (downstream side) of the hollow interior and the capability (flow rate) of the liquid feed pump is illustrated in FIG. 17: The capability of the liquid feed pump increases as the intra-pipe pressure difference $\Delta P$ decreases. This relationship means that as the hollow interior becomes more clogged, the intra-pipe pressure difference $\Delta P$ increases and the capability of the liquid feed pump decreases. Therefore, if the internal pressure difference $\Delta P$ is less than the threshold value (for example, 30 kPa), the controller 40 can determine that the capability of the liquid feed pump exceeds a set value (for example, 50%) and that there is no clogging in the hollow interior. If the intra-pipe pressure difference $\Delta P$ is equal to or greater than the threshold value, the controller 40 can determine that capability of the liquid feed pump is equal to or less than the set value and that the hollow interior is clogged.

Figure 18:
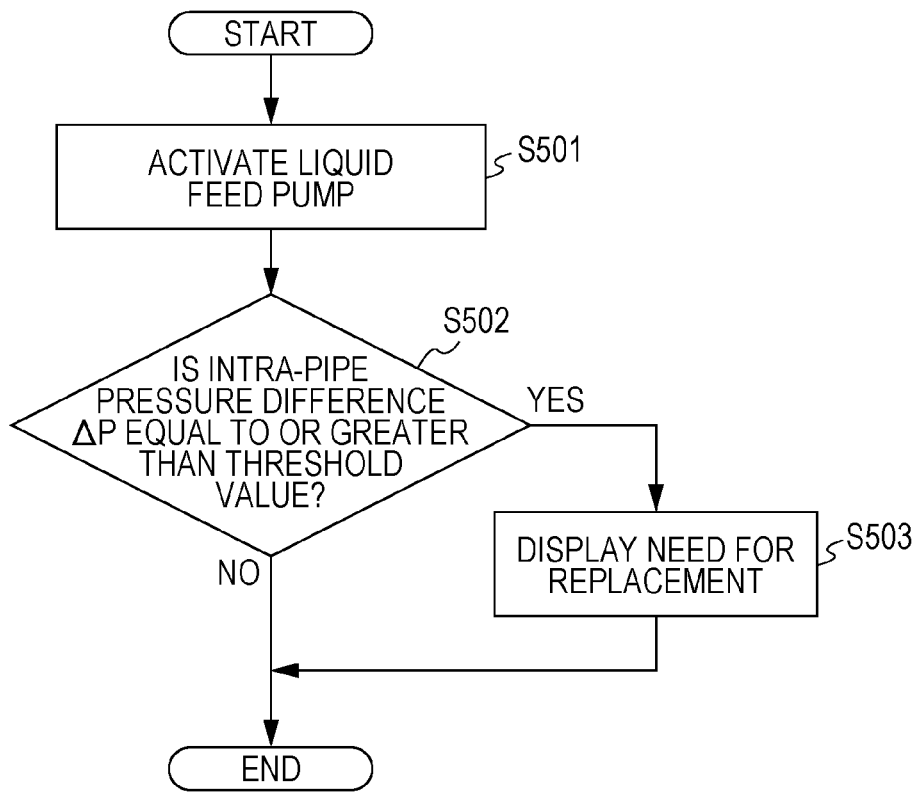
FIG. 18 is a flowchart illustrating the operation of the controller according to one or more embodiments.

FIG. 18 is a flowchart illustrating the operation of the controller in one or more embodiments.

In this case, as illustrated in FIG. 18, the controller 40 activates the liquid feed pump 243 (step S501).

The controller 40 detects the intra-pipe pressure at one end (side close to the liquid feed pump 243, or upstream side) of the hollow interior and the intra-pipe pressure at the other end (downstream side), and determines whether the intra-pipe pressure difference $\Delta P$ is equal to or greater than the threshold value (step S502). If the intra-pipe pressure difference $\Delta P$ is equal to or greater than the threshold value, the process proceeds to step S503. If the intra-pipe pressure difference $\Delta P$ is less than the threshold value, the process is terminated.

The controller 40 displays an indication that the hollow interior of the hollow fiber bundle 242e is clogged and the hollow fiber bundle 242e (degassing apparatus 242) should be replaced with an unused one (step S503).

The controller 40 may detect clogging of the hollow interior of the hollow fiber bundle 242e based on the flow rate of the ink in the hollow interior.

As illustrated in FIG. 2, the ink flow rate sensor 254 detects the ink flow rate on the ink flow path 24b and outputs the information to the controller 40. In the one or more embodiments, the ink flow rate sensor 254 is provided in the vicinity of the degassing apparatus 242, but the ink flow rate sensor 254 may be provided at any position on the ink flow path 24b.

When the liquid feed pump 243 is activated, the ink flow rate on the ink flow path 24b rises. When the output of the liquid feed pump 243 is constant, the ink flow rate is large if there is no clogging in the hollow interior and the pressure (dynamic pressure) loss is small, and the ink flow rate becomes smaller as the pressure (dynamic pressure) loss increases due to clogging of the hollow interior. Therefore, by detecting the magnitude of ink flow rate on the ink flow path 24b, the degree of clogging in the hollow interior can be detected.

In response to determining that the hollow interior of the hollow fiber bundle 242e is clogged (if the result of detection of clogging is input to the controller 40 by the clogging detector), the controller 40 causes the display 44 to display an indication of clogging of the hollow interior.

Specific configurations, shapes, materials, operations, numerical values, and the like in the description of the above embodiments are merely examples for explaining the present invention, and the present invention is not limited by these.

Although the degassing apparatus described above is used in an inkjet recording apparatus, the degassing apparatus can be applied not only to an inkjet recording apparatus but also to any apparatus from which dissolved gas in the liquid needs to be removed.

According to one or more embodiments of the present invention, there can be provided a degassing apparatus capable of specifying that the cause of a failure is clogging of the hollow interior of hollow fibers when the failure occurs, eliminating the need to find another cause of the failure, and preventing an unnecessary, wasteful replacement of hollow fibers, and an inkjet recording apparatus including the degassing apparatus.

Although the disclosure has been made with reference to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A degassing apparatus comprising:
a plurality of hollow fibers disposed on a supply path for a liquid, the hollow fibers comprising a gas permeable film that is permeable to dissolved gas in the liquid, wherein
the liquid is brought into contact with an exterior of the hollow fibers, and
a hollow interior of the hollow fibers not in contact with the liquid is depressurized to allow the dissolved gas in the liquid to permeate the hollow interior; and
a clogging detector that detects clogging of the hollow interior of the hollow fibers caused by a component in the liquid when the depressurized side is opened to an atmosphere.

2. The degassing apparatus according to claim 1, wherein the clogging detector detects clogging of the hollow interior based on a difference in air pressure between one end and another end of the hollow interior.

3. The degassing apparatus according to claim 1, wherein the clogging detector detects clogging of the hollow interior based on a time that elapses before an air pressure of the hollow interior reaches a predetermined air pressure.

4. The degassing apparatus according to claim 1, wherein the clogging detector detects clogging of the hollow interior based on a flow velocity of air in the hollow interior.

5. The degassing apparatus according to claim 1, further comprising:
a hardware processor to which a detection result provided by the clogging detector is input; and
a display that is controlled by the hardware processor, wherein
when the clogging detector detects clogging of the hollow interior of the hollow fibers, the hardware processor causes the display to display an indication of the clogging of the hollow interior.

6. The degassing apparatus according to claim 5, further comprising:
a clogging processor that predicts clogging of the hollow interior based on a detection state of the clogging detector and inputs a prediction result to the hardware processor, wherein
when the clogging processor predicts clogging of the hollow interior, the hardware processor causes the display to display an indication that the clogging of the hollow interior has been predicted.

7. The degassing apparatus according to claim 1, wherein the liquid is ultraviolet curable ink.

8. An inkjet recording apparatus comprising:
the degassing apparatus according to claim 1; and
an inkjet head to which ink as a liquid degassed by the degassing apparatus is supplied, wherein
the ink is ejected from the inkjet head to form an image on a recording medium.

9. A degassing apparatus comprising:
a plurality of hollow fibers disposed on a supply path for a liquid, the hollow fibers comprising a gas permeable film that is permeable to dissolved gas in the liquid, wherein
the liquid is brought into contact with a hollow interior of the hollow fibers, and
an exterior of the hollow fibers is depressurized to allow the dissolved gas in the liquid to permeate the exterior; and
a clogging detector that detects clogging of the hollow interior of the hollow fibers caused by a component in the liquid, wherein
the clogging detector detects clogging of the hollow interior based on a difference in pressure between one end and another end of the hollow interior.

10. A degassing apparatus comprising:
a plurality of hollow fibers disposed on a supply path for a liquid, the hollow fibers comprising a gas permeable film that is permeable to dissolved gas in the liquid, wherein
the liquid is brought into contact with an exterior of the hollow fibers, and
an hollow interior of the hollow fibers is depressurized to allow the dissolved gas in the liquid to permeate the hollow interior; and
when the hollow interior is depressurized by sucking from one end of the hollow fibers, the clogging detector detects clogging of the hollow interior of the hollow fibers caused by a component in the liquid based on a difference in air pressure between the one end and another end of the hollow interior.

11. A degassing apparatus comprising:
a plurality of hollow fibers disposed on a supply path for a liquid, the hollow fibers comprising a gas permeable film that is permeable to dissolved gas in the liquid, wherein
the liquid is brought into contact with a hollow interior or exterior of the hollow fibers, and
a side of the hollow fibers not in contact with the liquid is depressurized to allow the dissolved gas in the liquid to permeate the depressurized side;
a clogging detector that detects clogging of the hollow interior of the hollow fibers caused by a component in the liquid;
a hardware processor to which a detection result provided by the clogging detector is input;
a display that is controlled by the hardware processor; and
a clogging processor that predicts clogging of the hollow interior based on a detection state of the clogging detector and inputs a prediction result to the hardware processor, wherein
when the clogging processor predicts clogging of the hollow interior, the hardware processor causes the display to display an indication that the clogging of the hollow interior has been predicted.

* * * * *